United States Patent [19]

Stewart

[11] 4,307,707
[45] Dec. 29, 1981

[54] CONTROL VALVE FOR SOLAR HEATING SYSTEMS

[75] Inventor: John M. Stewart, Ontario, Canada

[73] Assignee: Sunglo Solar Ltd., Downsview, Canada

[21] Appl. No.: 103,309

[22] Filed: Dec. 13, 1979

[51] Int. Cl.³ .................... F24J 3/02; F16K 15/00
[52] U.S. Cl. ........................ 126/420; 126/416;
137/61; 137/519.5; 137/533.21; 137/625.27;
251/133
[58] Field of Search ............... 126/415, 417, 416, 419,
126/420, 422; 137/59, 60, 61, 62, 398, 448,
533.21, 625.21, 519.5; 251/133

[56] References Cited

U.S. PATENT DOCUMENTS

| | | | |
|---|---|---|---|
| 1,572,964 | 2/1926 | Sanders | 137/448 |
| 4,061,132 | 12/1977 | Ashton et al. | 126/419 |
| 4,119,087 | 10/1978 | Cook | 126/420 |
| 4,133,511 | 1/1979 | Hartmann et al. | 251/133 |
| 4,191,166 | 3/1980 | Saarem et al. | 126/420 |

Primary Examiner—Samuel Scott
Assistant Examiner—Lee E. Barrett
Attorney, Agent, or Firm—Rogers, Bereskin & Parr

[57] ABSTRACT

A control valve for a solar heating system is disclosed. The valve has a valve body which defines four chambers disposed end to end. A valve operating rod is movable axially through all four chambers uder motor control and carries a valve member for directing liquid through the valve. In one position of the valve member, incoming liquid is directed to an outlet for connection to a solar collector and liquid returning from the collector can flow through the valve body and back to the swimming pool. In the other position of the valve member, the liquid bypasses the collector and is directed back to the pool while liquid in the collector drains back into the valve body through the outlet and is removed by suction from a drain-down chamber in the valve body.

12 Claims, 6 Drawing Figures

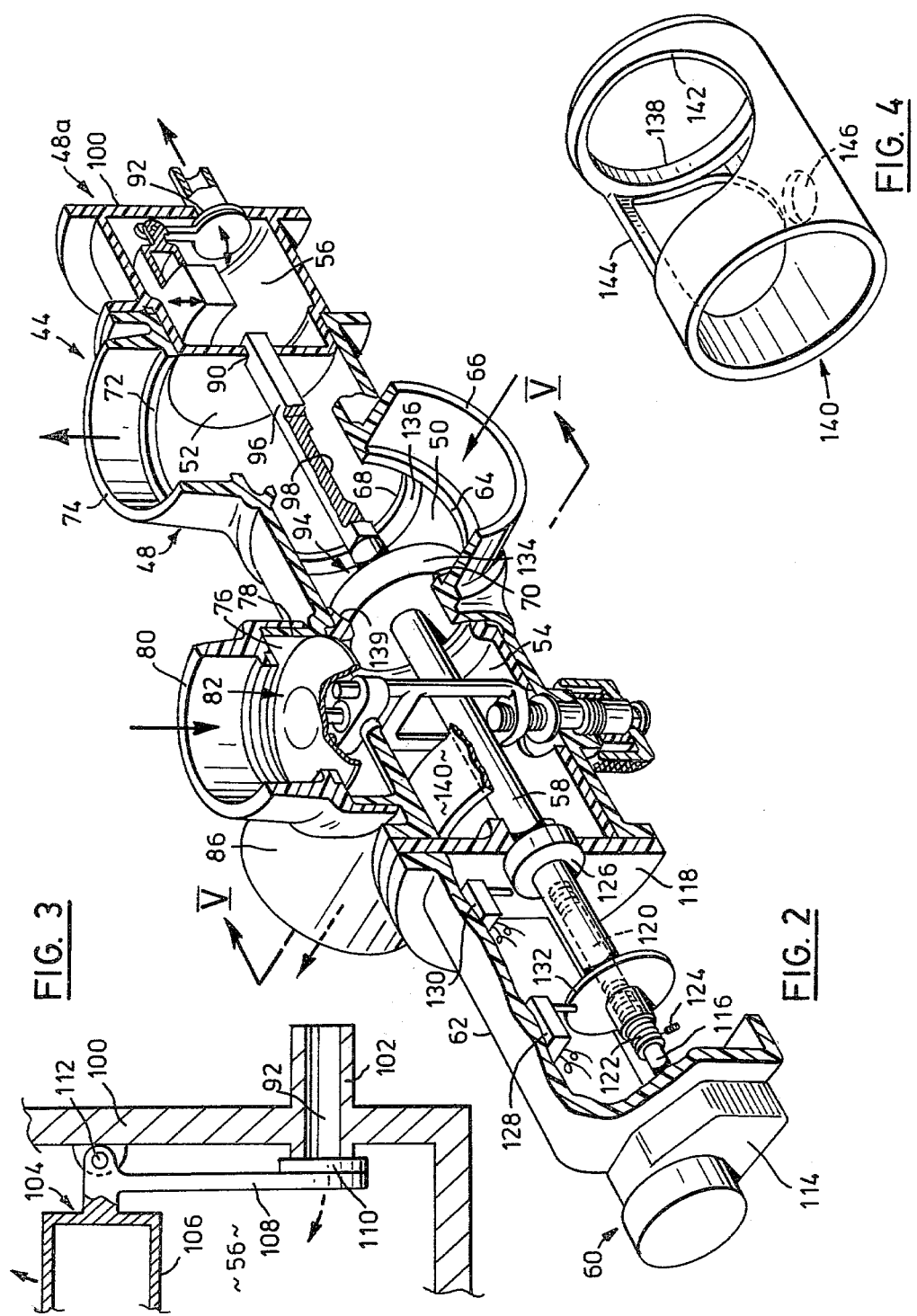

CONTROL VALVE FOR SOLAR HEATING SYSTEMS

This invention relates generally to solar heating systems for swimming pools and the like, and is concerned more particularly with a control valve for such a system.

Systems of this kind typically comprise an array of solar collectors connected in what is essentially a conventional pool water filtration circuit. The collectors are connected in the circuit downstream of the filter and heated water is returned to the pool directly from the collectors. Provision is usually made to bypass the collectors so that the filtration system can be used normally on days when there is insufficient solar energy available for heating purposes.

U.S. Pat. No. 3,906,928 (Wright) discloses a system of this type in which hydraulically operated pinch valves are used to divert water through the solar collectors at appropriate times. The pinch valves are operated by a four-way hydraulic control valve which is itself controlled by a solar heat sensor.

A disadvantage of systems which incorporate hydraulic valves is that secondary hydraulic connections are required for operating the valves themselves. Not only does this complicate initial installation of the system, but since the valves are operated using water from the swimming pool itself, malfunctions are common due to the presence of debris in the water which tends to clog the narrow hydraulic control lines.

Another problem with many conventional solar heating systems is that thermal syphoning takes place during periods of insufficient solar energy (e.g. on an intermittently cloudy day) so that heat from the pool is actually lost to ambient air during these periods. In other words, the collectors act as heat sinks. Even if the system is designed to cause the water to bypass the collectors at this time, water remaining in the collectors will cool and will have a chilling effect on the water in the pool when water flow through the collectors is subsequently re-established and the cooled water is returned to the pool. More seriously, there is the risk that the water in the collectors may freeze at night or during unexpected periods of cold weather, for example in fall or spring, unless special precautions are taken to deliberately drain down the collectors. Freezing of the water in the collectors can lead to severe damage.

A still further problem with some prior art systems having a collector bypass facility is that it is possible for the collectors to be subjected to excessively high water pressures, with consequent risk of structural damage to the collectors. For example, such systems normally include a pinch valve in the flow line to the collectors, and a check (one way) valve in the return line from the collectors. When the system is operating in the bypass mode, the pinch valve is closed so that no water flows through the check valve. However, the check valve is subjected to full pump pressure in the reverse direction. If that valve should leak, the collectors will be gradually pressurized by water flowing in the reverse direction past the check valve because the pinch valve is closed.

An object of the present invention is to provide an improved control valve for a solar heating system of the kind which includes at least one solar collector having flow and return lines, a reservoir for liquid to be heated, and a pump for circulating liquid from the reservoir through the collector for heating.

According to the invention, the valve includes a valve body which defines a valve chamber, flow and return chambers, and a drain-down chamber. The valve chamber has an inlet for liquid to be heated and first and second outlets. The flow and return chambers communicate respectively with the first and second valve chamber outlets and the flow chamber has an outlet adapted to be coupled to the solar collector flow line for delivering liquid to the collector. The return chamber has an inlet adapted to be coupled to the solar collector return line and an outlet for returning liquid received from the collector to the reservoir. Check valve means is associated with the return chamber inlet and is adapted to prevent reverse flow of liquid in the inlet. The drain-down chamber has an inlet for receiving liquid drained from the collector, and an outlet through which drained liquid can be returned to the reservoir. The inlet of the drain-down chamber communicates with the flow chamber. Valve means is also provided and includes a primary valve member disposed in the valve chamber and movable between first and second positions in which said first and second valve chamber outlets respectively are closed. The valve means includes valve actuating means operable from externally of the chambers and adapted to move the valve member between its said positions. A secondary valve member is provided in association with the drain-down chamber inlet and is operable simultaneously with the primary valve member to close said inlet when the primary valve member is in its said second position, and to open said inlet when the primary valve member is in its first position.

According to another aspect of the invention, there is provided a solar heating system incorporated such a control member.

In order that the invention may be more clearly understood, reference will now be made to the accompanying drawings which illustrate a preferred embodiment of the invention by way of example, and in which:

FIG. 2 is a perspective view of the valve, longitudinally sectioned to show its internal components;

FIGS. 3 and 4 are detail views of part of FIG. 2;

Figure 1:
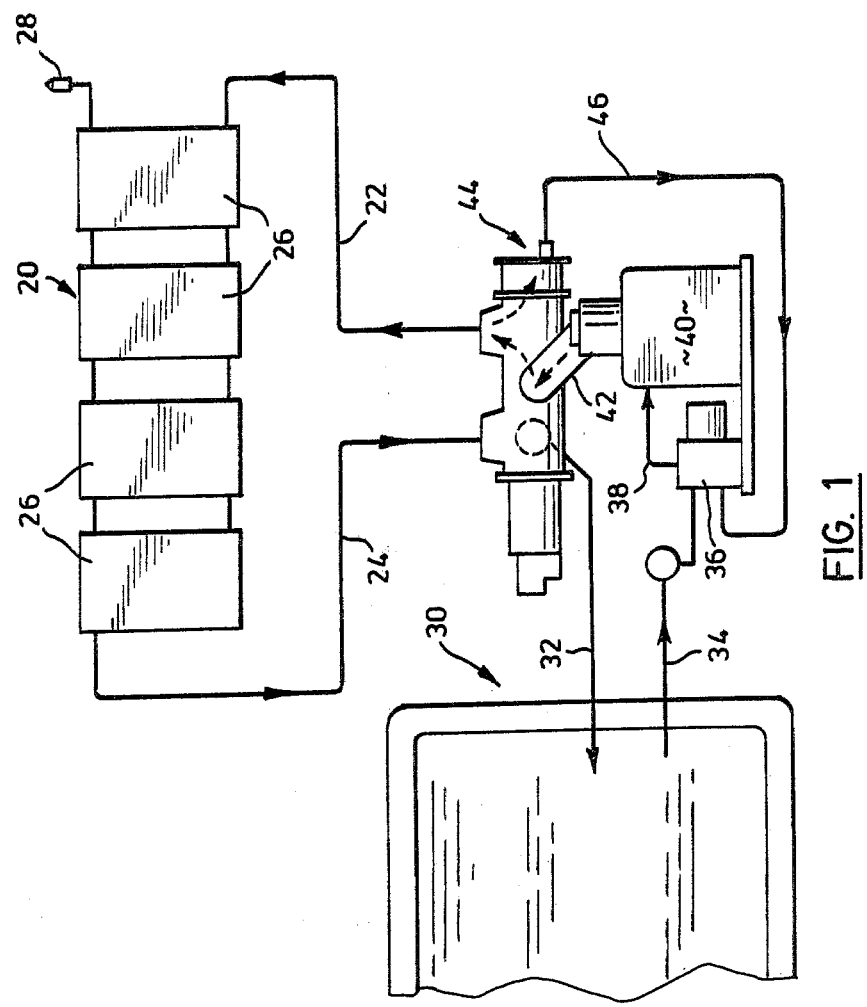
FIG. 1 is a diagrammatic illustration of a solar heating system incorporating the valve provided by the invention.

Referring first to FIG. 1, an array of solar collectors is generally indicated at 20 and flow and return lines for respectively delivering water to and returning water from the collectors are indicated at 22 and 24. The collectors are individually designated 26 and are connected together side by side in conventional fashion. Since the collectors themselves form no part of the present invention, they will not be described in more detail. It is sufficient to note that each collector will have upper and lower headers and a collector panel extending between the headers and having a plurality of fluid flow passageways providing communication between the headers. A vacuum breaker is shown at 28 and is coupled to the collectors for allowing air to enter the collectors when water is drained therefrom.

A swimming pool containing water is shown at 30 and water inlet and outlet lines associated with the pool are indicated at 32 and 34 respectively. The outlet line 34 is connected to the suction side of a pump 36 having an output line 38 at its pressure side. Line 38 is connected to a filter having an output line 42. A control valve of the form provided by the invention is generally indicated at 44 and is connected in the primary circulation circuit formed by the lines 32 and 34 and the pump filter as shown. The valve is also connected to the collectors by the flow and return lines 22 and 24. As will be more specifically explained later, valve 44 is a unitary control valve capable of performing all control functions associated with the operation of the solar collectors 26. When the collectors are in operation, water from the pool is delivered by valve 44 along line 22 to the collectors and is returned to the pool from line 24 by way of pool return line 32. When the collectors are not in operation, the water is delivered directly from the filter outlet line 42 to the pool return line and the valve is also designed to automatically drain the collectors at this time so as to avoid the problems discussed above involved with allowing the collectors to remain full of water while water from the pool is bypassing the collectors. Reference numeral 46 indicates an additional line connected between the valve 44 and the suction side of the pump 36 for returning to the pump water drained from the collectors as will be more specifically described later.

Reference will now be made to FIG. 2 in describing the structure of valve 44. The valve includes a valve body generally denoted 48 in the form of a plastic moulding. The valve body defines four internal chambers, namely a valve chamber 50, flow and return chambers 52 and 54 respectively and a drain-down chamber 56. It will be seen that the four chambers are disposed end to end with the flow and return chambers on opposite sides of the valve chamber and with the drain-down chamber at the end adjacent the flow chamber 52. Valve body 48 has a generally cylindrical overall shape and extends about a longitudinal axis represented in FIG. 2 by a valve operating rod 58. Rod 58 is adapted to be longitudinally displaced within valve body 48 to operate the valve by a reversible electric motor 60 mounted on the outer end of a housing 62 at the end of valve casing 48 remote from the drain-down chamber 56.

Valve chamber 50 has an inlet 64 for connection to the filter output line 42 (FIG. 1). Inlet 64 is surrounded by a collar 66 formed integrally with the valve body 48 to which a suitable connecting pipe can be attached, e.g. by solvent welding. Inside valve body 48, valve chamber 50 has first and second outlets indicated respectively at 68 and 70. The outlets are defined by transverse annular wall portions extending inwardly from said valve body. The first outlet 68 communicates with the flow chamber 52 and the second outlet 70 communicates with the return chamber 54.

Flow chamber 52 itself has an outlet 72 which communicates with the solar collector flow line 22 (FIG. 1). A collar 74 surrounds outlet 72 for connection to a suitable coupling pipe by solvent welding.

Return chamber 54 has an inlet 76 coupled to the solar collector return line 24 and surrounded by a collar 78 similar to the collar 74 of chamber 52. However, in this case, a fitment 80 is solvent welded to collar 78 for the purpose of retaining a check valve 82 (see later) disposed within inlet 76. The check valve is designed to allow water to flow into inlet 76 in the direction of the arrow in FIG. 2 but to close the inlet under the effect of water flowing in the opposite direction. Return chamber 54 also has an outlet for returning water received from the collectors to the pool. The outlet itself is not visible in FIG. 2 but it is surrounded by a coupling collar 86, part of which is visible. The opening itself is shown at 88 in FIG. 5.

The drain-down chamber 56 is disposed at the far end of the valve body as seen in FIG. 2 and is in fact formed by a separate moulding 48a which is solvent welded to the moulding which defines the other three chambers and which forms part of the valve body. Chamber 56 has an inlet 90 for receiving water drained from the collectors (see later) and an outlet 92 through which drained water can be returned to the pool as will be described.

A primary valve member denoted 94 is disposed in the valve chamber 50 and is movable between first and second positions in which it closes the first and second valve chamber outlets 68 and 70 respectively. The valve member is shown in its second position in FIG. 2. Member 94 is integrally mounted on the valve operating rod 58 so that longitudinal displacement of this rod will cause the valve member to move between its two positions as will be described. A secondary valve member is provided in association with the drain-down chamber 56 and is operable simultaneously with the primary valve member 94 to close the inlet 90 to the drain-down chamber when the primary valve member is in its second position, and to open the inlet when the primary valve member is in its first position. In this embodiment, this secondary valve member is defined by a squared outer end portion 96 of the valve operating rod 58 which is dimensioned to closely fit inside the drain-down chamber inlet 90. A recess 98 is formed in one face of rod portion 96 and is spaced inwardly from the outer end of that portion by an extent such that the recess is disposed in inlet 90 when the primary valve member 94 is in its first position. At this time, the recess allows communication between the flow chamber 52 and drain-down chamber 56.

Accordingly, when the valve member 94 is in the position in which it is shown in FIG. 2, water entering valve chamber 50 from the filter 40 (FIG. 1) will flow through the first outlet 68 of chamber 50 and into the flow chamber 52. Drain-down chamber inlet 90 would be closed at this time and the water will therefore flow from chamber 52 into the flow line 22 to the solar collectors. After having passed through the collectors, the water will return through the inlet 76 of return chamber 54 and will pass into the pool return line 32 through return chamber outlet 88. If valve member 94 is displaced to close the first outlet 68 of valve chamber 50 (by axially displacing rod 58) incoming water will be diverted from the valve chamber 50 through its outlet 70 and into the return chamber 54. The pressure of this water will cause the check valve 82 to close and the water will flow through outlet 88 and return directly to the pool. At the same time, the water in the collectors will drain down through flow line 22 and into the flow chamber 52. The valve operating 58 will have been displaced to the right at this time so that the recess 98 in the outer end portion of the shaft will be positioned in the drain-down chamber inlet 90. The water in chamber 52 will accordingly be able to flow through recess 98 and into the drain-down chamber. Vacuum breaker 28 (FIG. 1) will allow air to enter the solar collectors at this time so that the water can drain freely.

In an installation in which the valve 44 is disposed at a level above the pool 30, the water draining into draindown chamber 56 may be allowed to flow back directly into the pool by gravity. Thus, it will merely be necessary to provide a simple drain tube from an opening in the wall of chamber 56. However, it is preferred to provide for positive draining of water from chamber 56 (and hence from the panels) under suction. This arrangement is to be preferred even where the valve is installed at a level higher than the pool although, as indicated above, it is not absolutely essential in this case. In any event, in the illustrated embodiment, the draindown chamber outlet 92 communicates with the suction side of the pump 36 shown in FIG. 1 by way of the line 46 indicated in that view.

FIG. 3 shows the outer end wall of drain-down chamber 56 somewhat enlarged. The wall is indicated at 100 and is formed with an integral cylindrical sleeve 102 which defines outlet 92. Suction line 46 in fact takes the form of a length of plastic tubing which is solvent welded over sleeve 102 but is not shown in FIG. 3. The other end of the tube is connected to the suction side of pump 36. This may conveniently be done by simply removing the normal drain plug provided in a swimming pool pump, inserting a fitting in the plug opening, and coupling the tube to the fitting. In other cases, the tube could be connected to the main suction line into the pump, e.g. by way of a T-fitting.

Where a suction connection is provided to draindown chamber 56, a flow control valve is preferably provided for normally closing the outlet so that the interior of the valve is not continuously under suction pressure. This valve is generally indicated at 104 in FIG. 3 and takes the form of a simple float 106 connected to one arm of a crank 108, the other arm of which carries a valve member 110 for closing outlet 92. The crank is pivoted to the end wall of chamber 56 at a pivot point 112 intermediate its arms. The weight of the float normally maintains valve member 110 in a position in which it closes outlet 92. However, in the event that water accumulates in chamber 56, the float will be lifted, causing the valve member 110 to move away from opening 92 and allow the suction effect of the pump to remove the water from chamber 56.

Axial movement of valve operating rod 58 to move the valve member 94 between its first and second positions is effected by the motor 60 mentioned above. Motor 60 incorporates a speed reduction gear box 114 disposed externally of the motor support casing 62 and having an output shaft 116 which extends into the casing. Shaft 116 is aligned with the valve operating rod 58 and the rod extends through the adjacent end wall 118 of the valve body 48. Inside casing 62, rod 58 is formed with an internal screw threaded portion 120 which receives a complimentarily externally screw threaded sleeve 122 secured to gear box output shaft 116 by a grub screw 124. The co-operating screw threads are relatively coarse Acme threads. Accordingly, when motor 60 is energized, the gear box output shaft 160 will turn causing sleeve 122 to turn inside the end of rod 58. The rod itself cannot turn because its squared outer end portion 96 is received in the square opening which represents the inlet to the drain-down chamber 56. Accordingly, rod 58 will be constrained to move axially and effect the required displacement of valve member 94. Rod 58 moves axially through a housing 126 on end wall 118 which contains a seal (not shown) to guard against leakage of water from the return chamber 54 into casing 62. In this connection, it will be noted that the casing 62 is open at the bottom so that any liquid which might leak into the casing can drain freely away.

Two limit switches 128 and 130 are mounted inside casing 62 for co-operation with a disc 132 integrally formed on rod 58 inside casing 62. Motor 60 is a d.c. motor and the switches 128 and 130 are connected to a polarity-reversing power supply circuit to the motor (not shown) designed to stop the motor when one of the switches is energized and then reverse the polarity of the supply to the motor the next time it is operated. Thus, if the motor were to be continuously energized, it would cause the valve operating rod 58 to continuously reciprocate back and forth through stroke determined by the spacing of the limit switches 128 and 130. The limit switches are of course positioned so that the valve member 94 moves between its first and second positions as rod 58 reciprocates.

In practice, the power supply circuit to motor 60 will be a relatively sophisticated automatic control circuit including temperature sensors for automatically operating valve 44 in accordance with temperature conditions prevalent in the system and with ambient temperatures. As part of this system, a thermistor (not shown) will be positioned in a housing (not shown) formed externally of the valve body 48 and communicating with valve chamber 50 so that the termistor will respond to the temperature of the water in that chamber. However, this control circuit forms no part of the present invention and will not therefore be described in detail.

Valve operating rod 58 is a plastic moulding. The valve member 94 is formed by moulding onto an integral disc on rod 58, a ring 134 of a resilient material (e.g. synthetic rubber). This ring 134 seals against complimentary surfaces inside the valve body 48 in the respective positions of the valve member. One of these sealing surfaces is indicated at 136 and is defined around an inner face of the annular internal wall which defines the first outlet 68 of chamber 50. The corresponding sealing face for the second position of the valve member is indicated at 138 and is defined by an end face of an insert disposed inside the return chamber 54. The insert is shown individually in FIG. 4 and is denoted 140. It will be seen that insert 140 is of generally cylindrical shape and part of the sealing face 138 is visible inside one end of the cylinder. A recess 142 is provided in the wall of the cylindrical insert and matches the return chamber inlet 76 and outlet 88. A stiffner member 144 extends across part of this recess between the two openings. A further circular recess 146 is provided in the wall of insert 140 and accomodates part of an adjustment mechanism for the check valve 82. This mechanism will now be described in more detail primarily with reference to FIGS. 5 and 6.

Figure 5:
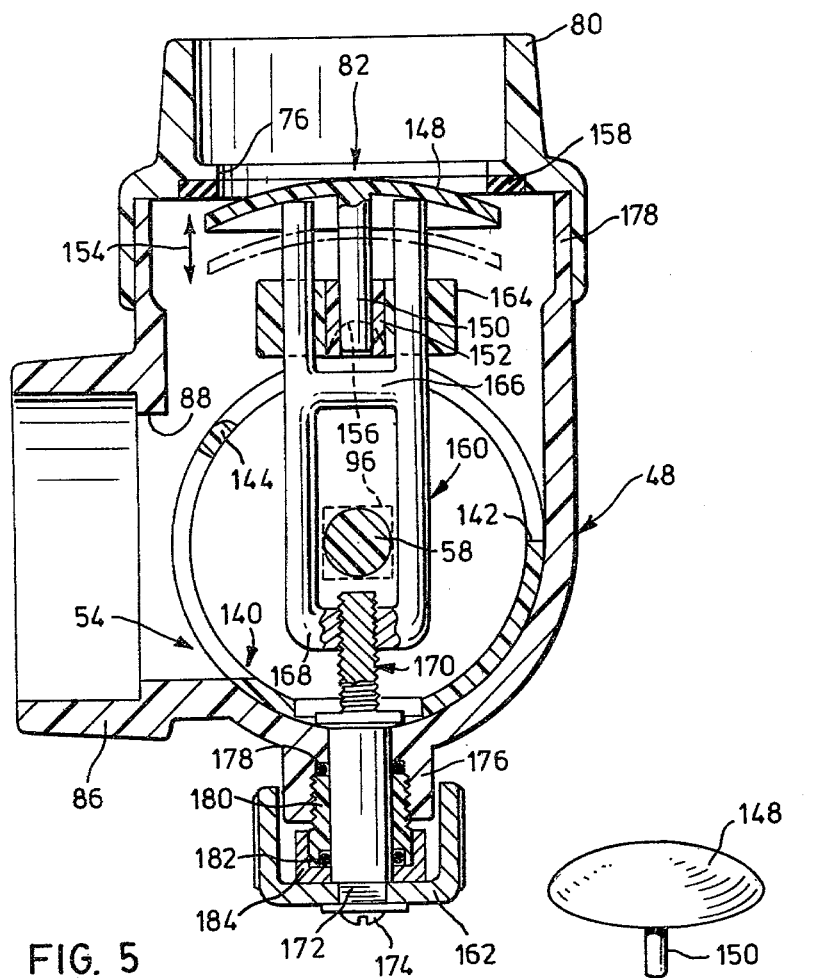
FIG. 5 is a sectional view on line V—V of FIG. 2.
Figure 6:
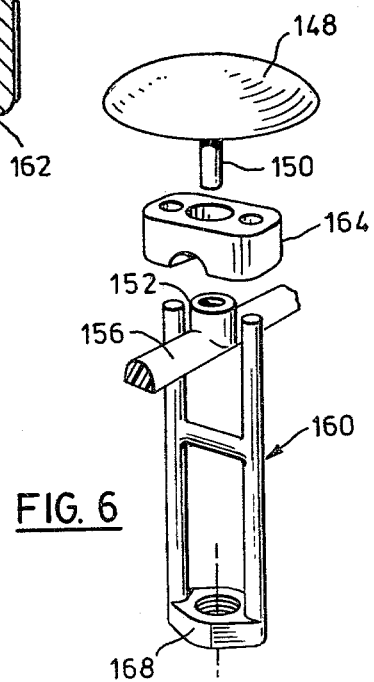
FIG. 6 is an exploded perspective view of part of FIG. 5.

Check valve 82 comprises a domed valve element 148 having a depending stem 150 which is a free sliding fit in a fixed collar 152 so that the valve element is vertically movable as indicated by the arrow 154 in FIG. 5. Collar 152 is formed integrally on a bridge piece 156 which extends across the opening 76 to the return chamber 54 (see FIG. 2). The valve element and stem are lighter than water so that, when chamber 54 fills with water from valve chamber 50 (valve member 94 in its first position) the valve element will float upwards and close the opening 76. A sealing gasket 158 surrounds the opening at its lower side and is positioned for co-operation with the valve element 148.

In addition to functioning as a check valve, valve element 148 can be adjusted in the vertical direction so that the valve will also act as a flow control valve for water entering the return chamber 54 through inlet 76. Thus, by varying the spacing of valve element 148 from the opening, the flow through the opening can be controlled. This adjustment is effected by the mechanism shown in FIGS. 5 and 6. The mechanism includes a fork shaped member 160 which is vertically adjustable by means of an adjusting knob 162 disposed externally of and below the valve body 48. Fork 160 is guided for vertical sliding movement in a guide element 164 which is secured by adhesive to the bridge piece 156 around collar 152. The limbs of fork 160 extend upwardly through openings in the guide element 164 and bear against the underside of valve element 148. Fork 160 includes two cross members 166 and 168, the lower one of which has a screw threaded opening receiving a complimentarily externally screw threaded member 170 which is turnably mounted in the bottom wall of valve body 48 and which has a squared portion 172 at its lower end received in a square opening in the knob 162. A screw 174 secures the knob to member 170. An enlargement 176 is formed on the valve body and defines a seal housing for an O-ring seal 178 disposed around member 170. The seal is held in place by a screw threaded sleeve 180 screwed into a complimentary opening in the exterior of the housing. Member 180 in turn receives a second O-ring 182 held in place by a cap 184 solvent welded to member 180.

When water is flowing downwardly through inlet 76 into return chamber 54, the valve element 148 will bear against the upper end of fork 160 so that the fork will define the position of the element and hence control the flow through inlet 76. By turning knob 162, member 170 will turn and cause axial movement of fork 160 in the appropriate direction and hence adjustment of the position of valve element 148. At the same time, the valve element is free to move upwardly as a result of its natural bouyancy in the event that water enters chamber 54 below the valve element 148.

It will be appreciated from the foregoing that the control valve provided by the invention can be easily installed to the other components of the solar heating system and does not require secondary plumbing or hydraulic operating connections to other parts of the system. Further, when the valve is in use, heat loss through the solar collectors of the system due to thermal syphoning is avoided because the collectors will automatically drain down in the event that the valve is operated to cause the water to bypass the collectors. Further, the form of control valve shown in the drawings will positively drain the solar collectors by suction even where the collectors are installed at a level below the level of the valve itself. Where the valve is connected to a suction line, there is no need to rely on gravity for drainage. At the same time, the valve provides the additional advantage of adjustable flow control of the water entering the return chamber of the valve.

Finally, it should be noted that the proceeding description relates to particular embodiments of the invention only and that many modifications are possible within the broad scope of the invention. For example, as indicated above, the float controlled valve arrangement employed in the drain-down chamber 56 is not essential if gravity can be employed to drain water from chamber 56 and return it to the pool. Also, while a power operated valve has been described, it will be appreciated that the valve could be arranged to operate manually by simply providing a handle or lever for axially displacing the valve operating rod 58 in place of the motor 60 and associated limit switches.

Further, while the preceeding description is directed primarily to solar heating systems for swimming pools, it is to be understood that the invention is not limited in this regard and that the control valve may be used in any liquid-type solar heating system.

The embodiments of the invention in which an exclusive property or privilege is claimed are defined as follows:

1. A control valve for a solar heating system which includes at least one solar collector having flow and return lines, a reservoir for liquid to be heated, and a pump for circulating liquid from the reservoir and through the collector for heating, the control valve comprising:
   a valve body which defines:
      a valve chamber having an inlet for liquid to be heated and first and second outlets;
      flow and return chambers communicating respectively with said first and second valve chamber outlets, said flow chamber having an outlet adapted to be coupled to said solar collector flow line for delivering liquid to the collector, and said return chamber having an inlet adapted to be coupled to said solar collector return line, said return chamber additionally having an outlet for returning liquid received from said collector to said reservoir;
      a drain-down chamber having an inlet for receiving liquid drained from said collector, and an outlet through which drained liquid can be returned to the reservoir, said inlet communicating with said flow chamber;
   check valve means associated with said return chamber inlet and adapted to prevent reverse flow of liquid in said inlet;
   valve means including a primary valve member disposed in said valve chamber and movable between first and second positions in which said member closes said first and second valve chamber outlets respectively, valve actuating means operable from externally of said chambers and adapted to move the valve member between its said positions, and a secondary valve member associated with said drain-down inlet and operable simultaneously with said primary valve member to close said inlet when said primary valve member is in its said second position, and to open said inlet when the primary valve member is in its said first position.

2. A valve as claimed in claim 1, further comprising float controlled valve means in said drain-down chamber adapted to normally close said outlet from the chamber but to open the outlet in response to a predetermined level of liquid in said chamber.

3. A valve as claimed in claim 1, wherein said valve body is of generally elongate shape extending about a longitudinal axis and wherein said chambers defined by the body are disposed in line with one another and spaced along said axis with said return chamber and flow chamber on respectively opposite sides of said valve chamber and said drain-down chamber at an end of the valve body adjacent said flow chamber.

4. A valve 25 claimed in claim 3, wherein each of said valve chamber inlet, said flow chamber outlet and said return chamber inlet and outlet is surrounded by a projecting collar formed integrally with the remainder of the valve body and adapted for coupling to external lines for connecting said valve in a solar heating system.

5. A valve as claimed in claim 3, wherein said valve actuating means comprises a rod mounted for axial movement along said axis of the valve body, wherein said primary valve member is carried by said rod for axial movement therewith between its said first and second positions, and wherein said secondary valve member is disposed at an end portion of said rod adjacent said drain-down chamber inlet.

6. A valve as claimed in claim 5, wherein said first and second outlets of said valve chamber are defined by respective transverse annular wall portions extending inwardly from said valve body and having annular sealing faces for sealing engagement by said primary valve member.

7. A valve as claimed in claim 5, wherein said secondary valve member comprises a squared end portion of said valve operating rod projecting through and closely fitted into a complimentary square opening in a transverse wall in said body between said flow chamber and said drain-down chamber, said opening defining said drain-down chamber inlet, and a recess formed in said squared end portion of said rod at a position such that the recess is disposed in said drain-down chamber inlet when said rod is in an axial position corresponding to said first position of said valve member.

8. A valve as claimed in claim 5, wherein said valve means further comprises a reversible electric motor disposed at an end of said valve body and operable from externally of the valve, and means coupling said motor with said valve operating rod and adapted to cause axial movement of the rod in response to operation of the motor.

9. A valve as claimed in claim 1, wherein said check valve means associated with said return chamber inlet comprises a valve element and a corresponding valve seat in said inlet, said valve element being freely movable between a closed position in which it co-operates with said seat, and a position in which it is spaced from the seat to define an annular opening for liquid entering said inlet, and wherein the check valve means further comprises means adjustable from externally of the valve body and adapted to define the maximum spacing of the valve element from said seat.

10. A valve as claimed in claim 9, wherein said adjustable means comprises a fork member supported below said valve element for axial sliding movement towards and away from said seat and adapted to support said valve element from below, an actuating element turnably mounted in a wall of said valve body and operable from externally of the body, and screw threaded means coupling said actuating element with said fork so that axial movement of the fork is produced by turning the actuating element.

11. A solar heating system comprising:

at least one solar collector having flow and return lines and vacuum breaker means for admitting air to said collector during draining of water therefrom;

a reservoir containing liquid to be heated;

means defining a main liquid circulation circuit and having an outlet through which liquid can be removed from said reservoir and an inlet through which liquid can be returned to the reservoir;

a pump in said circuit for conveying liquid from said outlet to said inlet;

a control valve coupled in said circuit and including: (a) a valve body which defines: a valve chamber having an inlet communicating with said pump for receiving liquid to be heated, and first and second outlets; flow and return chambers communicating respectively with said first and second valve chamber outlets, said flow chamber having an outlet coupled to said solar collector flow line through which liquid can be delivered to the collector, and said return chamber having an inlet coupled to said solar collector return line, said return chamber additionally having an outlet coupled to said circulation circuit inlet through which liquid received from said collector can be returned to the reservoir; a drain-down chamber having an inlet for receiving liquid drained from said collector and an outlet through which drained liquid can be returned to the reservoir, said inlet communicating with said flow chamber; (b) check valve means associated with said return chamber inlet and adapted to prevent reverse flow of liquid in said inlet; (c) valve means including a primary valve member disposed in said valve chamber and movable between first and second positions in which said member closes said first and second valve chamber outlets respectively; valve actuating means operable from externally of said chambers and adapted to move the valve member between its said positions; and a secondary valve member associated with said drain-down chamber inlet and operable simultaneously with said primary valve member to close said inlet when the primary valve member is in its said second position, and to open said inlet when the primary valve member is in its said first position.

12. A system as claimed in claim 11, wherein said control valve further comprises float control valve means in said drain-down chamber associated with said chamber outlet and adapted to normally close said outlet but to open the outlet in response to a predetermined level of liquid in said chamber; and wherein the system further comprises a suction line connected to said drain-down chamber outlet and to a suction side of said pump whereby liquid draining into said drain-down chamber can be drawn out of said chamber and into the pump when said float control valve means is open.

* * * * *